(12) United States Patent
Abraham et al.

(10) Patent No.: US 8,702,170 B2
(45) Date of Patent: Apr. 22, 2014

(54) VEHICLE SEAT

(75) Inventors: James Abraham, Köln (DE); Bernd Engels, Remscheid (DE); Johann Schreier, Dörentrup (DE); Peter Szegeny, Leverkusen (DE)

(73) Assignee: Johnson Controls GmbH, Burscheid (DE)

( * ) Notice: Subject to any disclaimer, the term of this patent is extended or adjusted under 35 U.S.C. 154(b) by 10 days.

(21) Appl. No.: 13/320,119

(22) PCT Filed: May 6, 2010

(86) PCT No.: PCT/EP2010/002779
§ 371 (c)(1),
(2), (4) Date: Jan. 23, 2012

(87) PCT Pub. No.: WO2010/130369
PCT Pub. Date: Nov. 18, 2010

(65) Prior Publication Data
US 2012/0119548 A1 May 17, 2012

(30) Foreign Application Priority Data
May 13, 2009 (DE) .................. 10 2009 021 211

(51) Int. Cl.
*B60N 2/02* (2006.01)
(52) U.S. Cl.
USPC .............. 297/341; 297/378.12; 297/378.1
(58) Field of Classification Search
USPC ................. 297/378.1, 378.12, 341
See application file for complete search history.

(56) References Cited

U.S. PATENT DOCUMENTS

| | | | |
|---|---|---|---|
| 4,634,180 A * | 1/1987 | Zaveri et al. | 297/341 |
| 5,927,809 A * | 7/1999 | Tame | 297/341 |
| 6,106,067 A * | 8/2000 | Zhuang et al. | 297/361.1 |
| 6,454,355 B2 * | 9/2002 | Biletskiy | 297/378.12 |
| 2004/0075323 A1 | 4/2004 | Blair et al. | |
| 2005/0052062 A1 | 3/2005 | Shiraki | |

FOREIGN PATENT DOCUMENTS

| | | |
|---|---|---|
| DE | 102005 44 555 B3 | 2/2007 |
| DE | 202005 21 469 U1 | 3/2008 |
| DE | 102007 53 958 A1 | 8/2008 |
| JP | 58-70929 | 5/1983 |
| JP | 2009-029272 A | 2/2009 |

OTHER PUBLICATIONS

English Translation of International Preliminary Report on Patentability dated Nov. 29, 2011 as received in corresponding PCT Application No. PCT/EP2010/002779, 5 pages.
International Search Report dated Jul. 5, 2011 as received in corresponding PCT Application No. PCT/EP2010/002779, 6 pages.
Notice of Reasons for Rejection mailed Jul. 16, 2013, as received in corresponding Japanese Patent Application No. 2012-510143, and English language translation of the same.

* cited by examiner

*Primary Examiner* — Sarah B McPartlin
(74) *Attorney, Agent, or Firm* — Foley & Lardner LLP (57) ABSTRACT

A vehicle seat includes a seat part and a backrest which is provided at the seat part so as to be rotatable, wherein the seat part and the backrest can be transferred into an easy entry position.

15 Claims, 8 Drawing Sheets

Fig. 9

VEHICLE SEAT

CROSS REFERENCE TO RELATED APPLICATIONS

The present application is a U.S. National Stage of International Application No. PCT/EP2010/002779, filed May 6, 2010, designating the United States, and claiming priority to German Patent Application No. 10 2009 021 211.6, filed May 13, 2009. The foregoing applications are hereby incorporated herein by reference in their entireties.

The present invention relates to a vehicle seat with a seat part and a backrest, which is provided rotatably on the seat part, wherein the seat part and the backrest can be transferred into an easy-entry position.

BACKGROUND

Such vehicle seats of the type in question are well known from the prior art. However, in addition to the easy-entry position, vehicle seats frequently also have to be able to be transferred into what is referred to as a "fold-flat position", in which the backrest is arranged substantially horizontally. The fold-flat position should only be set if the vehicle seat, in particular the vehicle seat part, is not in the easy-entry position. It is frequently also desirable for it only to be possible for the backrest to be transferred into a horizontal position if the seat part has been pivoted away from the seat part frame or if the seat part of an adjacent seat has been pivoted into said seat part. In order to block or enable these respective functions, vehicle seats of the prior art required a multiplicity of different drives or mechanical components, and therefore said vehicle seats were of comparatively complex construction.

SUMMARY

It was therefore the object of the present invention to provide a vehicle seat which is of simpler construction than the vehicle seats from the prior art.

This object is achieved by a vehicle seat with a seat part and a backrest, which is provided rotatably on the seat part, wherein the seat part and the backrest can be transferred into an easy-entry position, and the vehicle seat has an actuating element, on which a means for deactivating a blocking element, which prevents the transfer of the seat part into the easy-entry position, is fitted, and on which a means for limiting the inclination of the backrest in the easy-entry position is arranged.

The present invention relates to a vehicle seat which has a seat part and a backrest, wherein the backrest is provided rotatably on the seat part for comfort adjustment purposes, but also for the transfer into an easy-entry position and/or into a fold-flat position. The vehicle seat may be any seat located in a vehicle. However, the vehicle seat is preferably arranged behind the driver's seat or front passenger's seat. The vehicle seat is very particularly preferably a seat bench which provides space for a number of individuals.

According to the invention, the seat part and the backrest can be transferred into an easy-entry position which makes it easier to occupy a vehicle seat located behind the vehicle seat according to the invention. In the easy-entry position, the vehicle seat is displaced from the original position thereof forward in the direction of travel, and the backrest is inclined by a certain angle, preferably 40° to 50°, from the vertical in the direction of the vehicle seat. After the individual has sat down on the seat behind the vehicle seat according to the invention, the vehicle seat is guided back again from the easy-entry position thereof into the original use position thereof.

The vehicle seat according to the invention generally has means, in particular an upper rail and a lower rail, along which said vehicle seat can be displaced for adaptation of the seat position to the respective vehicle occupant, but also for the transfer of the vehicle seat into the easy-entry position. In this case, the upper rail is generally arranged on the vehicle seat and the lower rail on the vehicle bodywork. As a rule, that region of the lower rail, in which the vehicle seat is in the easy-entry position thereof, is designed in such a manner that, for safety reasons, the vehicle seat is unable to adopt this position during normal operation. Accordingly, at least one blocking element is arranged on the vehicle seat according to the invention, on the lower rail and/or the bodywork, said blocking element preventing transfer of the vehicle seat into the easy-entry position if said vehicle seat, for example, is occupied and in particular if the backrest of the vehicle seat is set substantially vertically. Said blocking element is deactivated during or after the transfer of the backrest into the easy-entry position and is activated during or after the return of the backrest into the use position.

According to the invention, the vehicle seat now has an actuating element, on which a means for deactivating said blocking element, which prevents the transfer of the seat part into the easy-entry position, is arranged, and on which a means for limiting the inclination of the backrest in the easy-entry position is arranged. Said means according to the invention prevents the vehicle seat from being transferred into an easy-entry position if the backrest is not already in the easy-entry position or in a position close to an easy-entry position. Furthermore, it is avoided that the vehicle seat is lowered beyond the easy-entry position in the direction of the vehicle seat. It is thereby possible, for example, to avoid destroying objects and/or harming individuals still on the vehicle seat. The actuating element is preferably prestressed in the direction of the seat cushion, preferably rotating in the direction of the seat cushion.

The actuating element is preferably connected to the backrest, and very particularly preferably, the actuating element is driven by the backrest. The effect achieved by this preferred embodiment of the present invention is that, when the backrest is folded forward into the easy-entry position, the blockade of the easy-entry region of the lower rail is essentially removed at the same time. Furthermore, it is ensured, with said preferred embodiment of the present invention, that, as soon as the backrest is in a substantially vertical position, the blocking element is activated again.

The vehicle seat according to the invention preferably has, in the seat part region thereof, a seat cushion which at least temporarily drives the abovementioned means, i.e. in particular presses said means downward when the seat cushion is in the use position thereof, in which an individual can sit thereon. It is thus ensured that the actuating element is in engagement with the blocking element when the seat cushion is in the use position.

The means for deactivating the blocking element is preferably an actuating contour which interacts in a form-fitting manner with an actuating means, for example the actuating pin which is provided on the blocking element. Furthermore preferably, during the transfer of the backrest from the use position into the easy-entry position, the actuating means drives an actuating lever which releases a locking means which locks the vehicle seat, for example the upper rail relative to the lower rail, in the respective position thereof relative to the bodywork. As a rule, said locking means is a means which locks the upper rail relative to the lower rail in the position desired in each case by the vehicle occupant. In order to transfer the vehicle seat into the easy-entry position, said locking means has to be released. This is preferably carried out with the abovementioned mechanism. As soon as the vehicle seat has been transferred again from the easy-entry position into the original position, said fixing, for example of the two rails relative to each other, enters into effect again.

A stop preferably limits the movement of the actuating lever in order to avoid the locking means being overstressed.

In a further preferred embodiment of the present invention, the backrest can additionally be transferred into a fold-flat position, in which the backrest is substantially horizontal.

Furthermore preferably, the seat cushion is provided such that it can be moved away, in particular can be pivoted away, from the seat part frame. In this case, the vehicle seat according to the invention, preferably in the front region of the seat part thereof, has a rotary mechanism about which the vehicle seat cushion can be transferred from a substantially horizontal position into a substantially vertical position. In said vertical position, the seat cushion is then preferably oriented parallel to the backrest of a vehicle seat located there in front.

Furthermore preferably, a further vehicle seat is arranged next to the seat according to the invention. Said further vehicle seat is preferably of narrower design than the seat according to the invention. For example, a 20/40 division of a 60% segment is involved.

At least the seat cushion of the further, in particular narrower, vehicle seat is preferably now provided so as to be able to pivot into the region of the seat part frame, in particular between the side parts thereof. For this purpose, a hinge is arranged, for example, on the seat part frame, in particular on the side part thereof which faces the further seat part, about which hinge the seat part of the further vehicle seat can be pivoted through essentially 180° into the region of the seat part frame.

Furthermore, the actuating element provided according to the invention has a blocking contour which prevents the backrest from being able to be transferred into the fold-flat position if the seat cushion is not moved away from the seat frame and/or the adjacent seat cushion is not arranged in the seat frame.

In a further preferred embodiment, the vehicle seat according to the invention has at least one, preferably two sensors, with which the position in which the seat part of the vehicle seat according to the invention and/or the seat part of the adjacent seat are/is in can be ascertained.

BRIEF DESCRIPTION OF THE DRAWINGS

The invention is explained below with reference to FIGS. 1 to 9. Said explanations are merely by way of example and do not restrict the general inventive concept.

DETAILED DESCRIPTION

Figure 1:
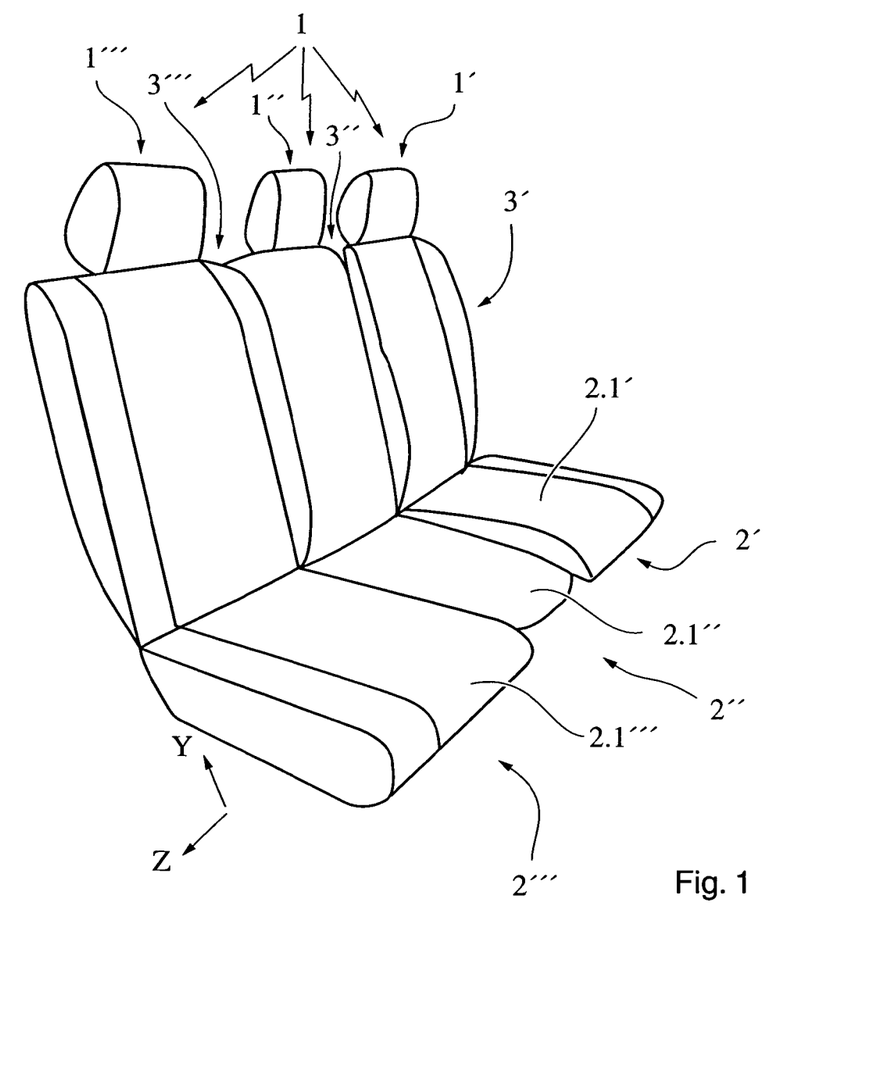
FIG. 1 shows a seat bench.

FIG. 1 shows a vehicle seat 1' to 1''' as part of a rear bench which, in the present case, consists of three seats. Each vehicle seat has a seat part 2' to 2''' and a backrest 3' to 3'''. The seat part of each vehicle seat has a seat cushion 2.1' to 2.1'''.

Figure 2:
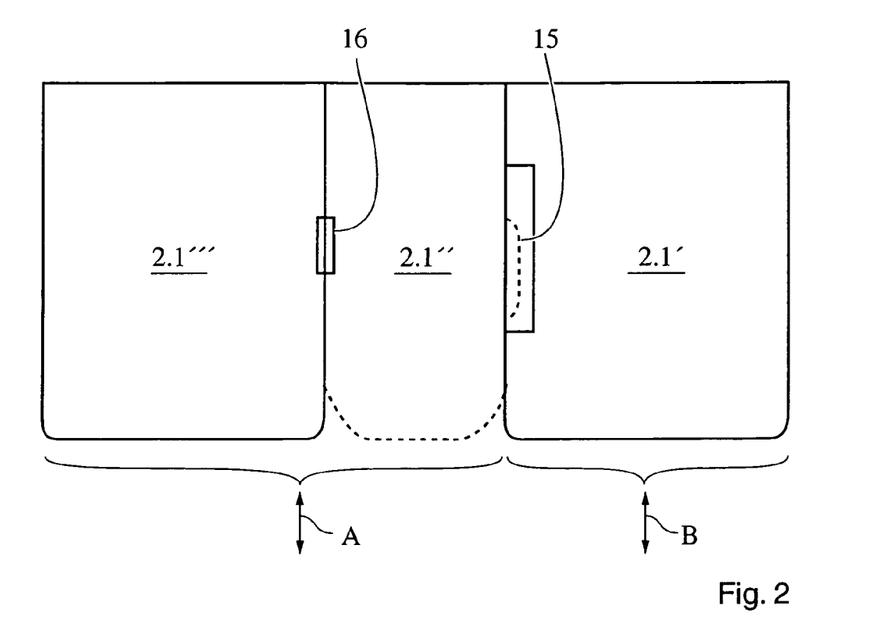
FIG. 2 shows the seat parts of the seat bench according to FIG. 1.

As can be seen in particular from FIG. 2, the seat bench according to FIG. 1 is a rear bench which is divided in a 60/40 ratio, wherein the part A is 60% and the part B is 40%. The part A consists of the vehicle seat 1''' according to the invention with the seat cushion 2.1''' and of the adjacent vehicle seat 1" with the seat cushion 2.1". The seat cushion 2.1" is mounted on the seat part frame 2.2''' of the seat 1''' by means of a hinge 16 such that it can be pivoted from the illustrated use position into a stowed position, in which the seat cushion 2.1" is located between the side parts of the seat part frame 2.2'''. The pivoting movement is symbolized by the arrow. On the side opposite the hinge, the seat part frame 2.2' of the seat 1' has a rest 15 on which the seat cushion 2.1" is supported in the use position thereof.

Figure 3:
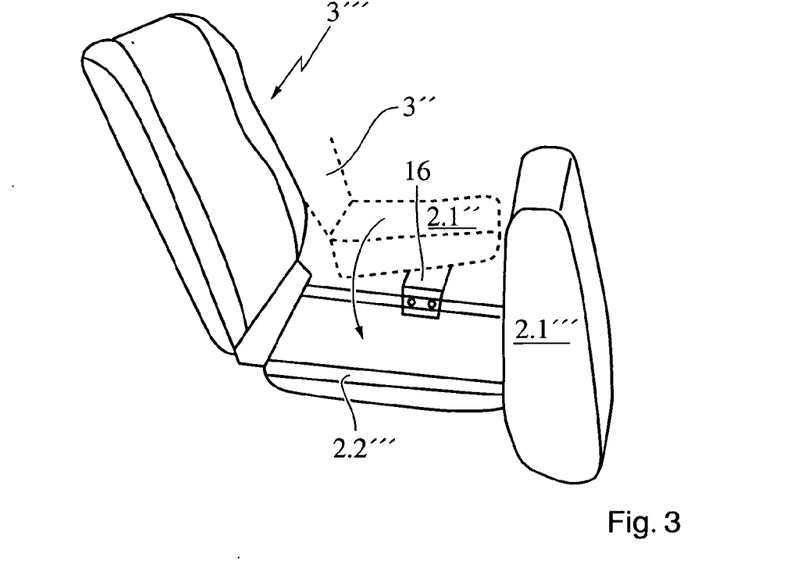
FIG. 3 shows the stowing of an adjacent seat part in the region of the seat frame.

As can be seen in particular in FIG. 3, the seat cushion 2.1''' can be transferred about an axis of rotation (not illustrated), which is located in the front region of the seat part frame 2.2''', from a substantially horizontal use position into a substantially vertical stowed position. This opens up that region of the seat part frame 2.2''' which is located under or in the region of the seat cushion 2.1''', and therefore the adjacent seat cushion 2.1" and optionally also the backrest 3" can be pivoted about the hinge 16 into said region and are therefore stowed.

Figure 4:
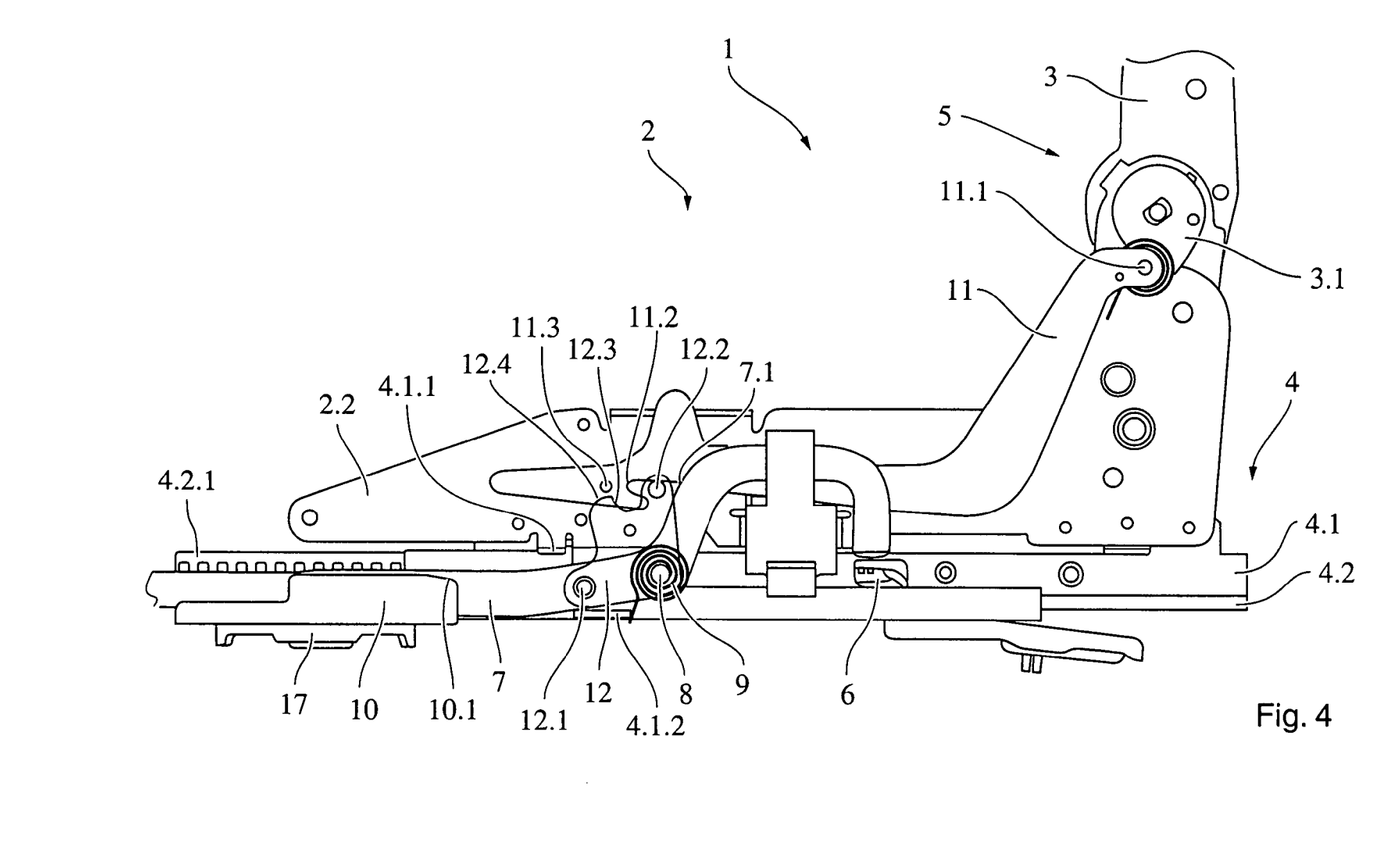
FIG. 4 shows the vehicle seat according to the invention in the use position thereof.

FIG. 4 shows the vehicle seat 1 according to the invention, in which only part of the backrest 3 is illustrated, and the seat cushion has been omitted for reasons of clarity. The vehicle seat according to the invention is preferably the vehicle seat which is referred to by 1''' in FIGS. 1-3 and consists of a seat part 2 and of a backrest 3 which is arranged on the seat part 2 so as to be rotatable about a recliner 5. The backrest can be pivoted about the recliner 5 for comfort setting purposes and for the transfer into an easy-entry position or a fold-flat position. The seat part frame 2.2 of the seat part 2 is connected fixedly to an upper rail 4.1 which is arranged displaceably along a lower rail 4.2. The seat part frame 2.2 is displaced along the lower rail 4.2 in order to set the desired seat position, but also for the transfer into the easy-entry position. In order to fix the vehicle seat in the desired position thereof, a locking means 6, for example a claw, is arranged on the upper rail 4.1, said claw interacting with recesses in the lower rail and fixing the upper rail 4.1 to the lower rail 4.2. In order to release said fixing in order to set the desired seat position, the vehicle seat according to the invention has an actuating lever 7 which is mounted rotatably about the rotary joint 8 and is prestressed preferably rotating counterclockwise. If said lever is rotated in the clockwise direction, the locking means 6 is released and the vehicle seat can be displaced in order to set the desired seat position. However, the seat should not be displaced to the left to the extent such that the upper rail 4.1 is located in the easy-entry region 4.2.1 of the lower rail 4.2. For this purpose, the vehicle seat according to the invention has a stop piece 12.1 which interacts with a stop 10 and, as a result, prevents the vehicle seat according to the invention from being displaced too far to the left. Said stop piece 12.1 is part of a blocking element 12, here a blocking plate, which is likewise mounted on the seat part frame 2.2 so as to be rotatable about the rotary bearing 8 and is prestressed, rotating counterclockwise, against the stop 4.1.2. The blocking plate and the actuating lever can be moved, here rotated, independently of each other. Furthermore, said blocking element 12 has an actuating pin 12.2. A further component of the vehicle seat according to the invention is the actuating element 11. Said actuating element 11 is arranged rotatably at the upper right end thereof on the fitting 3.1 by means of the coupling point 11.1. The fitting 3.1 is connected to the backrest 3 for conjoint rotation. The actuating element is prestressed in the direction of the seat cushion part, i.e. rotating in the clockwise direction in the present case, by means of a spring, but is also pressed downward by the seat cushion (not illustrated) if the latter is in the region of the seat part frame, i.e. in the use position thereof. This position is illustrated in FIG. 4. Furthermore, the actuating element 11 has an actuating contour 11.2 and a blocking pin 11.3. The actuating contour 11.2 enters into engagement with the actuating pin 12.2 while the backrest is transferred from the vertical position thereof into the easy-entry position.

Figure 5:
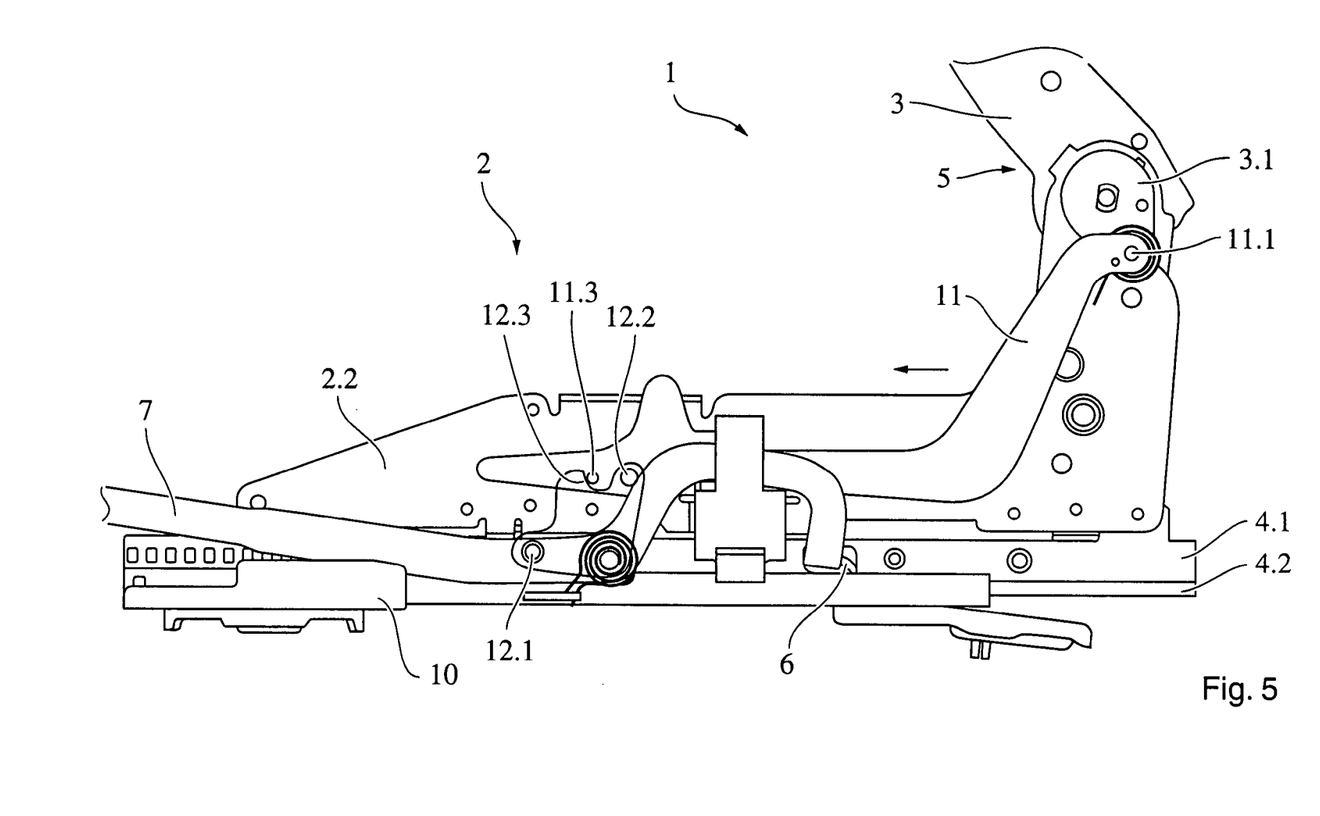
FIG. 5 shows the vehicle seat according to FIG. 4 during the transfer into the easy-entry position.

This transfer of the backrest into the easy-entry position is illustrated in FIG. 5. It can be seen that the backrest moves the actuating element 11 to the right, in the direction illustrated by the arrow. As a result, the actuating contour 11.2 enters into engagement with the actuating pin 12.2 and rotates the blocking element 12 in the clockwise direction about the rotary bearing 8 and counter to a spring force such that the blocking element 12 no longer bears against the stop 4.1.2. If the actuating pin 12.2 has been moved by the actuating element 11 to an extent such that said actuating pin touches the actuating lever 7, the actuating pin 12.2 pivots the latter in a manner rotating in the clockwise direction about the rotary bearing 8, as a result of which the actuating lever 7 releases the locking means 6. At the same time as this rotation of the blocking element 12, the stop piece 12.1 is likewise rotated in the clockwise direction, and therefore the latter is located above the stop 10 and therefore can no longer interact therewith in a blocking manner. By means of the release of the locking means 6 and the transfer of the stop piece 12.1 into the position illustrated in FIG. 5, the upper rail 4.1 of the vehicle seat according to the invention can be displaced into the easy-entry region 4.2.1 of the lower rail. In order to ensure that, during said movement, the stop piece 12.1 does not get caught on the stop 10, the latter has a ramp 10.1 in the right upper region thereof. In order to avoid the backrest 3 being moved again into the use position, the actuating element 11 has the blocking pin 11.3. Since the blocking pin 11.3 interacts with the actuating contour 12.3 of the blocking element 12, a movement of the actuating element 11 to the left, i.e. in the arrow direction, is also prevented as a result. As soon as the seat part has been pushed back again into the use position thereof, the blocking element 12 can again rotate counterclockwise and the backrest can be set upright again, and the entire movement described above is automatically reversed when the vehicle seat is displaced back into the original position thereof (FIG. 4).

The actuating element 11 is not actuated during a comfort adjustment of the backrest.

Figure 6:
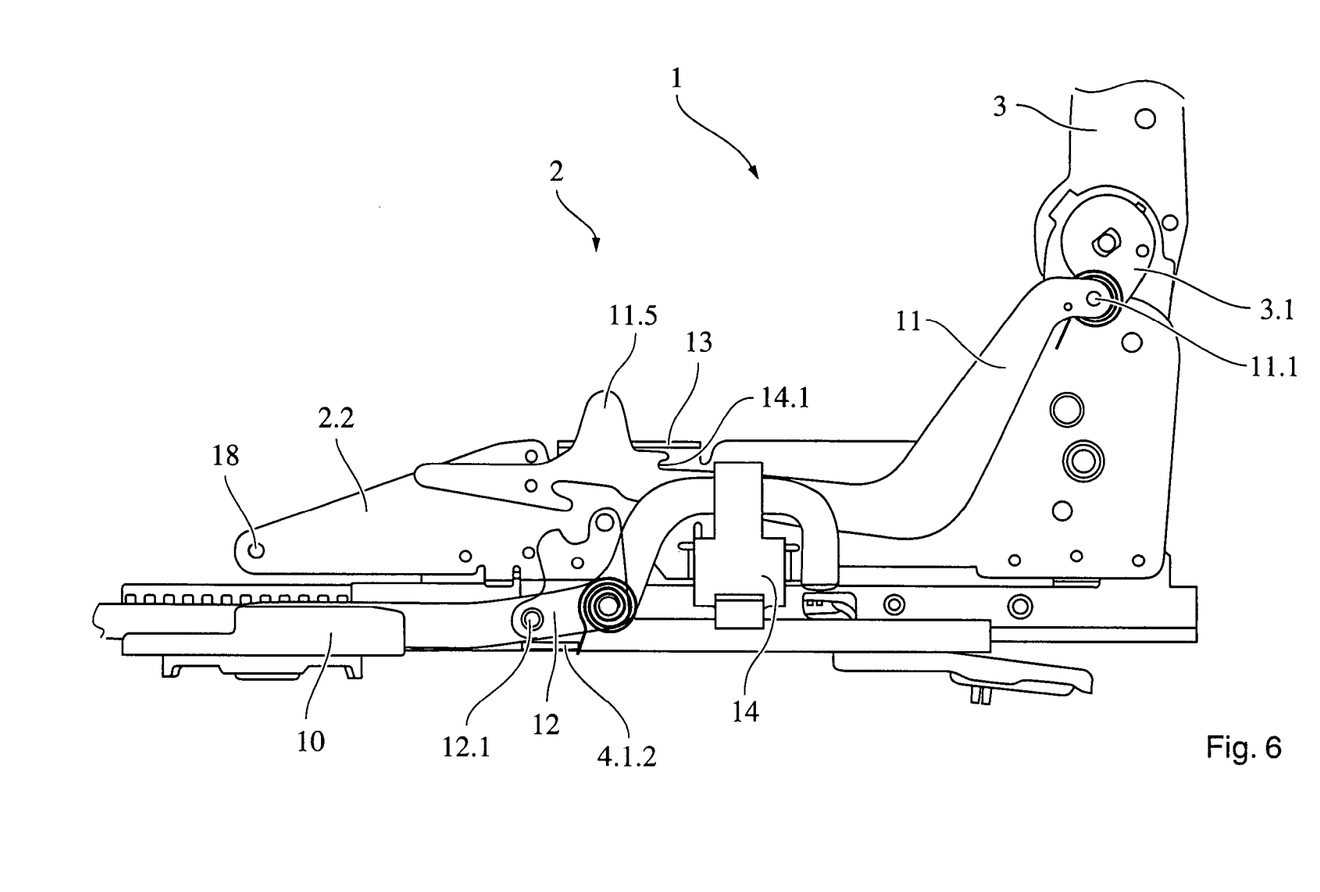
FIG. 6 shows the vehicle seat according to the invention according to FIGS. 4 and 5 after the pivoting away of the seat cushion part.
Figure 7:
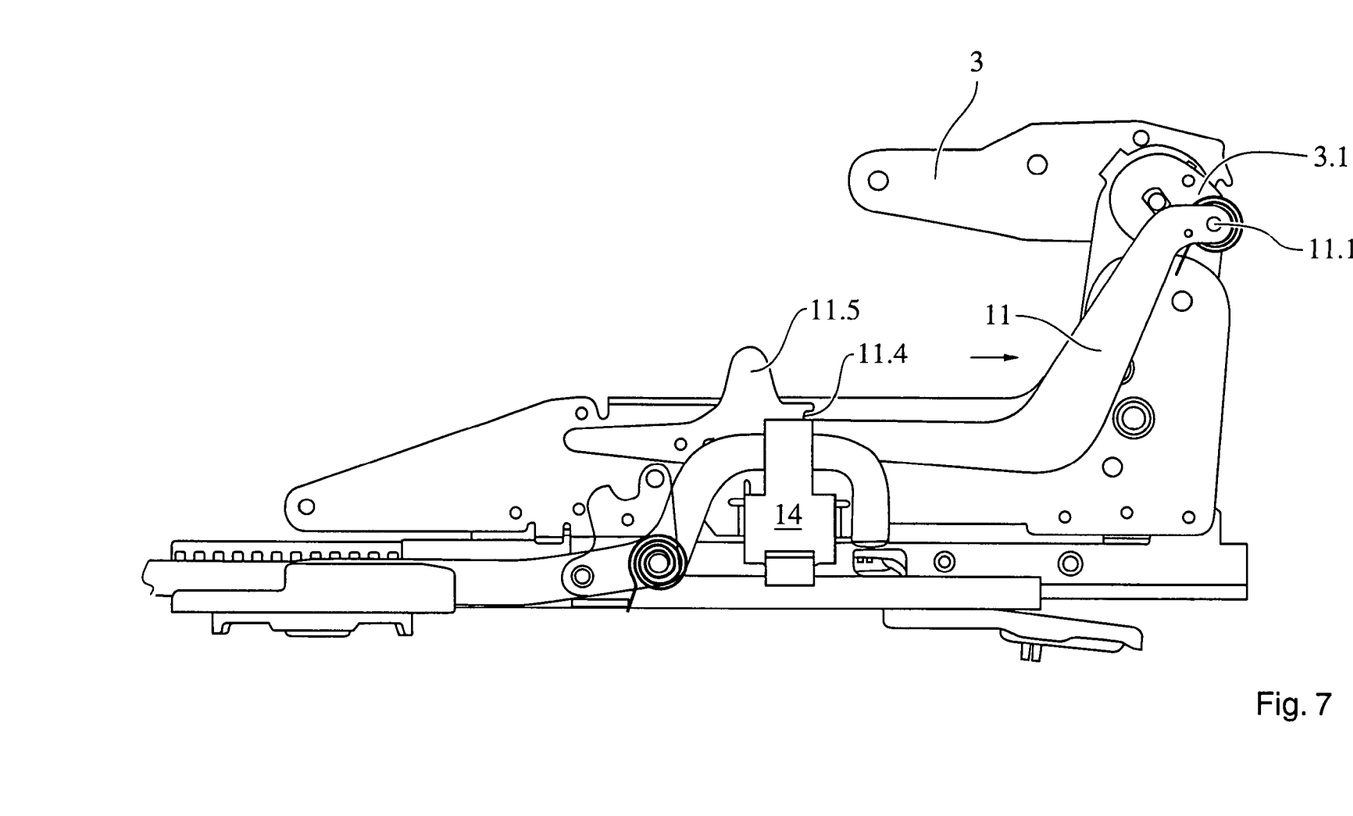
FIG. 7 shows the vehicle seat according to FIG. 6 in the fold-flat position.

FIG. 6 shows the vehicle seat according to the invention according to FIGS. 4 and 5. In the present case, the seat cushion (not illustrated) has been transferred from the horizontal position thereof into a vertical position about a bearing 18. As a result, the seat cushion sensor 11.5, which is located on the actuating element 11, is no longer in engagement with the seat cushion, and the actuating element 11, which is prestressed in the clockwise direction, can rotate for a distance in the clockwise direction about the coupling point 11.1 until said actuating element interacts with the stop 13. The actuating element 11 is thereby disengaged from the blocking element 12. This has the consequence that the blocking element 12, which is prestressed in a manner rotating counterclockwise, bears against the stop 4.1.2 thereof and therefore the stop piece 12.1 is positioned in such a manner that it enters into engagement with the stop 10 when the vehicle seat is shifted to the left. This prevents the vehicle seat, with the seat cushion pivoted into the vertical, from being able to pass into the easy-entry position. Owing to the fact that the actuating element no longer interacts with the blocking element 12, the rotational movement of the backrest beyond the easy-entry position into a fold-flat position is also possible in principle. However, in the present case, this transfer is still blocked by the center cushion sensor 14, the upper end of which prevents with a blocking contour 11.4 which is likewise provided on the actuating element 11. The center cushion sensor 14 is intended to prevent the backrest 3 from being transferred into the fold-flat position before the adjacent seat cushion 2.1" (cf. FIGS. 1 to 3) is located in the region of the seat part frame 2.2 of the seat part illustrated here. As soon as said seat part 2.1" (not illustrated) is in this position, the seat cushion sensor is pivoted outside the region of effect of the blocking contour 11.4 (out of the plane of the paper) and the actuating element can be displaced to the right, as illustrated by the arrow in FIG. 7, until the backrest 3 has taken up the fold-flat position which is illustrated in FIG. 7.

Figure 8:
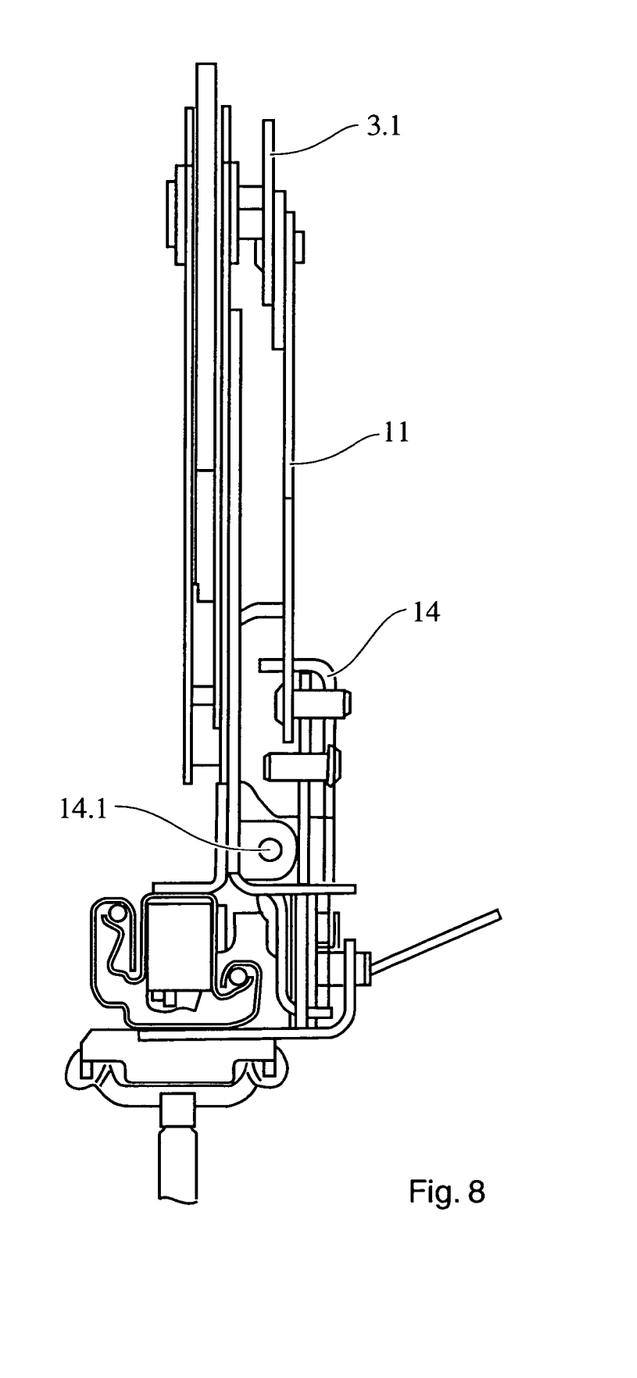
FIG. 8 shows the vehicle seat according to the invention before the arrangement of the adjacent seat cushion part in the region of the seat part frame.
Figure 9:
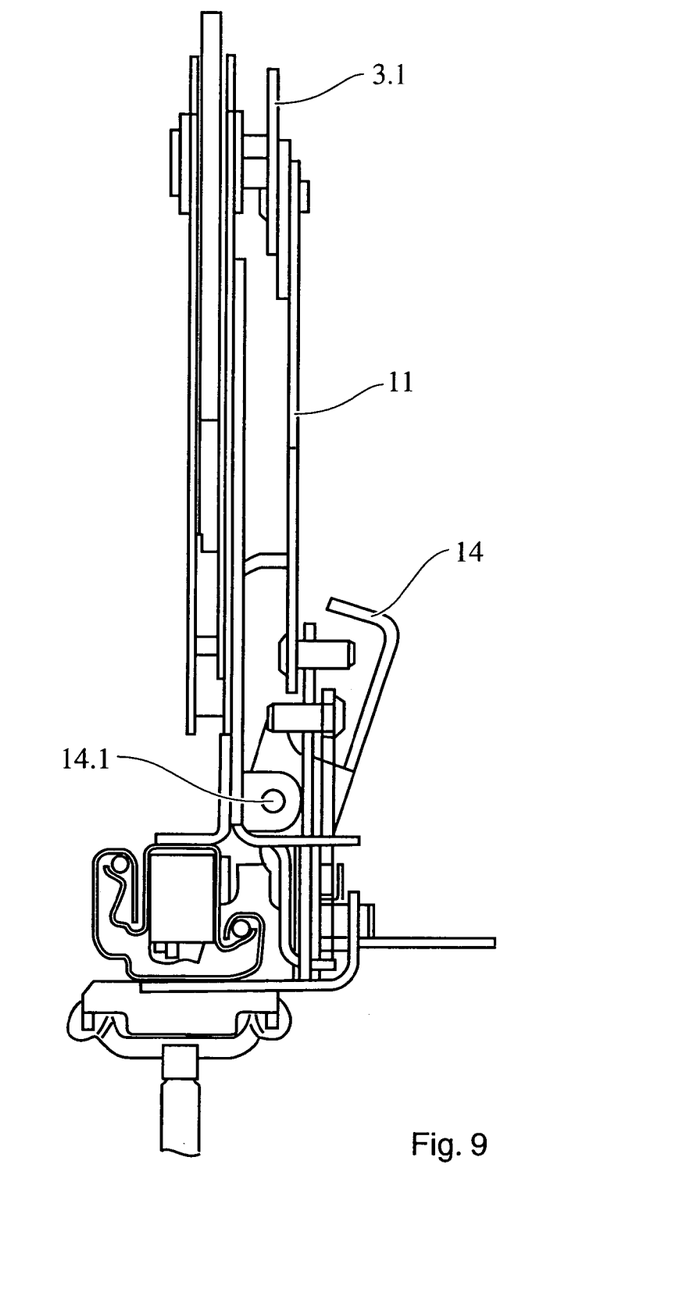
FIG. 9 shows the vehicle seat according to FIG. 8 after transfer of the adjacent seat part into the seat part frame.

The pivoting of the center seat cushion sensor 14 can be seen in particular in FIGS. 8 and 9. In FIG. 8, the center seat cushion is not in the region of the seat part frame, and therefore the center seat cushion sensor 14 is in engagement with the actuating element 11. However, as soon as the center seat cushion is arranged in this region, the seat cushion sensor 14, as illustrated in FIG. 9, is pivoted in the clockwise direction and is therefore no longer in the region of effect of the actuating element 11.

LIST OF REFERENCE NUMBERS

1 Vehicle seat
2 Seat part
2' First seat part segment
2" Second seat part segment, central segment
2'" Third seat part segment
2.1 Seat cushion
2.1' First seat cushion
2.1" Second seat cushion, central seat cushion
2.1'" Third seat cushion
2.2 Seat part frame
3 Backrest
3' First backrest segment
3' Second backrest segment
3'" Third backrest segment
3.1 Fitting
4 Rail
4.1 Upper rail
4.1.1 Stop
4.1.2 Stop
4.2 Lower rail
4.2.1 Easy-entry region of the lower rail
5 Recliner
6 Locking means
7 Actuating lever
7.1 Ramp
8 Rotary bearing of the actuating means 7 and of the blocking element 12

9 Spring means, torsion spring
10 Stop
10.1 Ramp
11 Actuating element
11.1 Coupling point
11.2 Actuating contour
11.3 Blocking pin
11.4 Blocking contour
11.5 Seat cushion sensor
12 Blocking element
12.1 Stop piece
12.2 Actuating pin
12.3 Actuating contour
12.4 Blocking contour
13 Limiting means
14 Center seat cushion sensor
15 Support
16 Hinge
17 Bodywork
18 Rotary joint

What is claimed is:

1. A vehicle seat for use in a vehicle, comprising:
a seat part with a seat part frame that is coupled to a seat positioning assembly such that the seat part is movable in a longitudinal direction in an unlocked state and the seat part is fixed in a locked state;
a backrest, which is provided rotatably on the seat part frame with at least one lockable recliner, wherein the seat part and the backrest are configured to be brought into an easy-entry position;
an actuating element on which a deactivating device and a limiting device are arranged;
a stop; and
a blocking element configured to interact with the stop such that a passage of the seat into an easy-entry region of the seat positioning assembly is prevented when the seat part in the unlocked state is moving into a predetermined seat position,
wherein the deactivating device is configured to deactivate the blocking element such that the seat in the unlocked state is movable into the easy-entry region of the seat positioning assembly,
wherein the limiting device is configured to limit an inclination of the backrest in the easy-entry position.

2. The vehicle seat as claimed in claim 1, wherein the backrest is configured to drive the actuating element.

3. The vehicle seat as claimed in claim 1, wherein the seat part further comprises a seat cushion configured to at least temporarily drive the actuating element.

4. The vehicle seat as claimed in claim 3, wherein the seat cushion is configured to be moved away from the seat part frame.

5. A vehicle seat system for a vehicle, comprising:
a first vehicle seat as claimed in claim 3, and
an adjacent vehicle seat arranged next to the first vehicle seat.

6. The vehicle seat system as claimed in claim 5, wherein the seat cushion of the first vehicle seat is configured to be pivoted into a region of the seat part frame.

7. The vehicle seat as claimed in claim 3, wherein the seat cushion is configured to be pivoted away from the seat part frame.

8. The vehicle seat as claimed in claim 1, wherein the deactivating device is an actuating contour configured to interact in a form-fitting manner with an actuating device provided on the blocking element.

9. The vehicle seat as claimed in claim 8, wherein, during transfer of the backrest from a use position into the easy-entry position, the actuating device is configured to drive an actuating lever configured to release a locking device of the seat positioning assembly which locks the vehicle seat in a respective position relative to bodywork.

10. The vehicle seat as claimed in claim 9, wherein another stop limits movement of the actuating lever.

11. The vehicle seat as claimed in claim 1, wherein the backrest is configured to be transferred into a fold-flat position.

12. The vehicle seat as claimed in claim 11, wherein the seat part further comprises a seat cushion, and wherein the limiting device is a blocking contour configured to prevent the backrest from being able to be transferred into the fold-flat position if at least one of the seat cushion is not moved away from the seat part frame and an adjacent seat cushion is not arranged in the seat part frame.

13. The vehicle seat as claimed in claim 1, further comprising a seat cushion sensor.

14. The vehicle seat as claimed in claim 1, wherein the seat positioning assembly comprises an upper rail fixed to the seat part, a lower rail, and a locking device having a locked position in which the upper rail is fixed relative to the lower rail, and an unlocked position in which the upper rail is movable relative to the lower rail.

15. The vehicle seat as claimed in claim 14, wherein the locking device comprises a claw that is arranged on the upper rail and configure to interact with recesses in the lower rail.

* * * * *